United States Patent
Croft et al.

(10) Patent No.: US 6,490,439 B1
(45) Date of Patent: Dec. 3, 2002

(54) LIGHTED ANTENNA FOR TRANSCEIVER DEVICE

(75) Inventors: Kenneth A. Croft, Salt Lake City, UT (US); Curtis D. Thompson, Taylorsville, UT (US); Jay B. McCleary, West Valley, UT (US)

(73) Assignee: 3COM Corporation, Santa Clara, CA (US)

( * ) Notice: Subject to any disclaimer, the term of this patent is extended or adjusted under 35 U.S.C. 154(b) by 32 days.

(21) Appl. No.: 09/680,548

(22) Filed: Oct. 4, 2000

(51) Int. Cl.[7] .................................................. H04B 1/38
(52) U.S. Cl. ........................ 455/90; 455/566; 455/67.7; 455/575; 343/702; 343/721
(58) Field of Search ................................ 455/566, 557, 455/67.1, 67.7, 90, 575; 343/702, 721

(56) References Cited

U.S. PATENT DOCUMENTS 5,605,506 A * 2/1997 Hoorn et al. .................. 463/47
5,872,781 A * 2/1999 Bennett et al. .............. 370/365
6,181,284 B1 * 1/2001 Madsen et al. ............. 343/702
6,215,984 B1 * 4/2001 Figueras et al. ............... 455/90
6,262,686 B1 * 6/2001 Delarminat et al. ......... 343/721

FOREIGN PATENT DOCUMENTS

JP 402104031 * 4/1990 ............ H04B/7/26

* cited by examiner

Primary Examiner—William Trost
Assistant Examiner—Danh Le
(74) Attorney, Agent, or Firm—Wagner, Murabito & Hao

(57) ABSTRACT

A transceiver device and method thereof for sending signals to and receiving signals from another device via a wireless connection and for providing information about the wireless connection to a user. An antenna coupled to the transceiver is visible to the user. The antenna is a lighted antenna that is adapted to provide a visual indication of a wireless signal to a user. The lighted antenna can be used to show that the transceiver is transmitting or receiving signals, that a data connection has been made, or that a Bluetooth piconet has been detected. The color and/or intensity of the lighted antenna can be varied to indicate, for example, the strength of the signal. With a lighted antenna, additional features and functionality can be incorporated into a transceiver device while maintaining the form factor of existing designs. The multi-functionality of a lighted antenna is particularly suited for smaller devices where space is at a premium.

20 Claims, 14 Drawing Sheets

LIGHTED ANTENNA FOR TRANSCEIVER DEVICE

BACKGROUND OF THE INVENTION

1. Field of the Invention

The present invention relates to the field of wireless transceiver devices. Specifically, the present invention relates to a wireless transceiver device that uses a multi-functional lighted antenna to provide visual information about a wireless connection to a user.

2. Related Art

Wireless technologies are widely used for communication in modern society. In addition to personal cordless telephones (e.g., cell phones) and pagers, computer systems (in particular, handheld or portable computer systems including personal digital assistants) are more commonly being equipped with transceivers capable of broadcasting wireless signals (e.g., radio signals) over relatively long distances.

In addition, efforts are underway to develop technologies allowing hardware connections (e.g., cable connections) between devices to be replaced with wireless ones. For example, the Bluetooth technology provides a technology specification for small form factor, low-cost, short-range radio links between personal computers, mobile phones and other devices. Bluetooth is targeted at users who wish to establish a link, or small network, between their computer, cellular phone and other peripherals.

Wireless communication technologies provide users with greater mobility and convenience. Mobility and convenience are enhanced as devices such as cell phones and personal digital assistants (PDAs) are reduced in size. However, even as wireless communication devices are being made smaller and lighter, consumer preferences are driving manufacturers to further reduce the size and weight of such devices relative to the competition.

Manufacturers are also being driven by consumer preferences to provide wireless communication devices with additional functionality and features, in order to enhance user convenience as well as to distinguish their devices from competing devices. Accordingly, manufacturers must turn to creative and innovative approaches to provide added functionality and features without increasing the size and weight of the device, and without eliminating existing features.

For example, wireless communication devices are generally equipped with a Receiver Signal Strength Indicator (RSSI) that can be used to measure and display the strength of the incoming signal. However, a problem with a prior art RSSI is that it can take up valuable space on the housing of the wireless communication device. That is, the housing for a portable device is generally small and the available surface area is typically heavily utilized, with little space available for new or additional features. The RSSI provides information of value to users, and therefore the RSSI cannot be eliminated to make room for another feature or to reduce the size of the device. A similar argument can be made for other features of a portable device.

Therefore, what is needed is an apparatus and/or method that can allow the available space on a portable device to be more effectively used, without reducing the functionality currently provided by such devices. The present invention provides these advantages and others not specifically mentioned above but described in the sections to follow.

SUMMARY OF THE INVENTION

The present invention provides a device and method that can be used to more effectively utilize the space available on a portable device, without reducing the functionality currently provided by such devices. In particular, the present invention provides a device and method that can be used in a portable wireless communication device, such as a cell phone, a portable computer system (e.g., personal digital assistant), and the like.

The present invention pertains to a transceiver device and method thereof for sending signals to and receiving signals from another device via a wireless connection and for providing information about the wireless connection to a user. In the present embodiment, an antenna coupled to the transceiver is visible to the user. In accordance with the present invention, the antenna is a lighted antenna that is adapted to provide a visual indication of a wireless signal to a user.

In one embodiment, a light source (such as a light-emitting diode) is located at the tip of the antenna. In another embodiment, the light source is located at the base of the antenna. In this embodiment, the antenna includes light-conducting material for conducting the light from the base to a position (e.g., the tip) on the antenna where the light is visible to a user.

In one embodiment, the lighted antenna can be used to show that the transceiver is transmitting or receiving signals, that a data connection has been made, or that a Bluetooth piconet has been detected. In other embodiments, the color and/or intensity of the lighted antenna can be varied to indicate, for example, the strength of the signal.

Thus, with a lighted antenna, additional features and functionality can be incorporated into a transceiver device while maintaining the form factor of existing designs. The multi-functionality of a lighted antenna is particularly suited for smaller devices where space is at a premium.

These and other objects and advantages of the present invention will become obvious to those of ordinary skill in the art after having read the following detailed description of the preferred embodiments which are illustrated in the various drawing figures.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending" or "receiving" or "providing" or "varying" or "executing" or "storing" or the like, refer to the action and processes of a computer system (e.g., process 1100 of FIG. 11), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Portable Computer System Network Environment

Figure 1A:
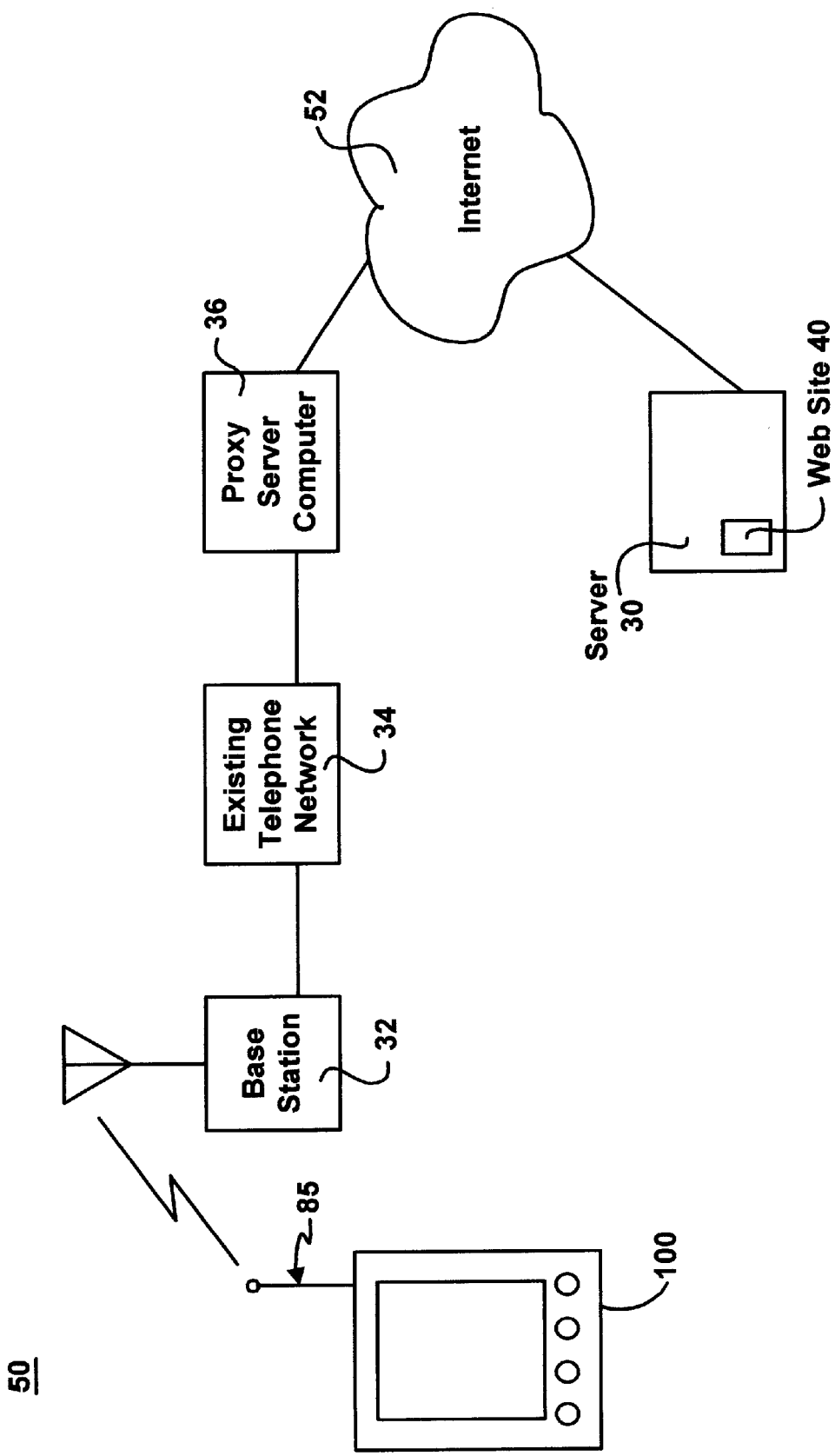
FIG. 1A is a block diagram of an exemplary network environment including a portable computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system or as a personal digital assistant (PDA).

In the present embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown).

Wireless signals are transmitted and received by portable computer system 100 using antenna 85. In accordance with the present invention, antenna 85 is a lighted antenna. As such, antenna 85 can be used to provide a visual indication that conveys information to a user about, for example, the strength of the incoming signals, whether portable computer system 100 is transmitting or receiving, or whether a data connection has been made. Additional information is provided in conjunction with FIGS. 10A, 10B, 10C and 11.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52.

Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be further appreciated that other embodiments of a communications network, planned or envisioned, may be utilized in accordance with the present invention. For example, a wireless connection may be made from portable computer system 100 via antenna 85 directly to the Internet 52.

The data and information which are communicated between base station 32 and portable computer system 100 via antenna 85 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
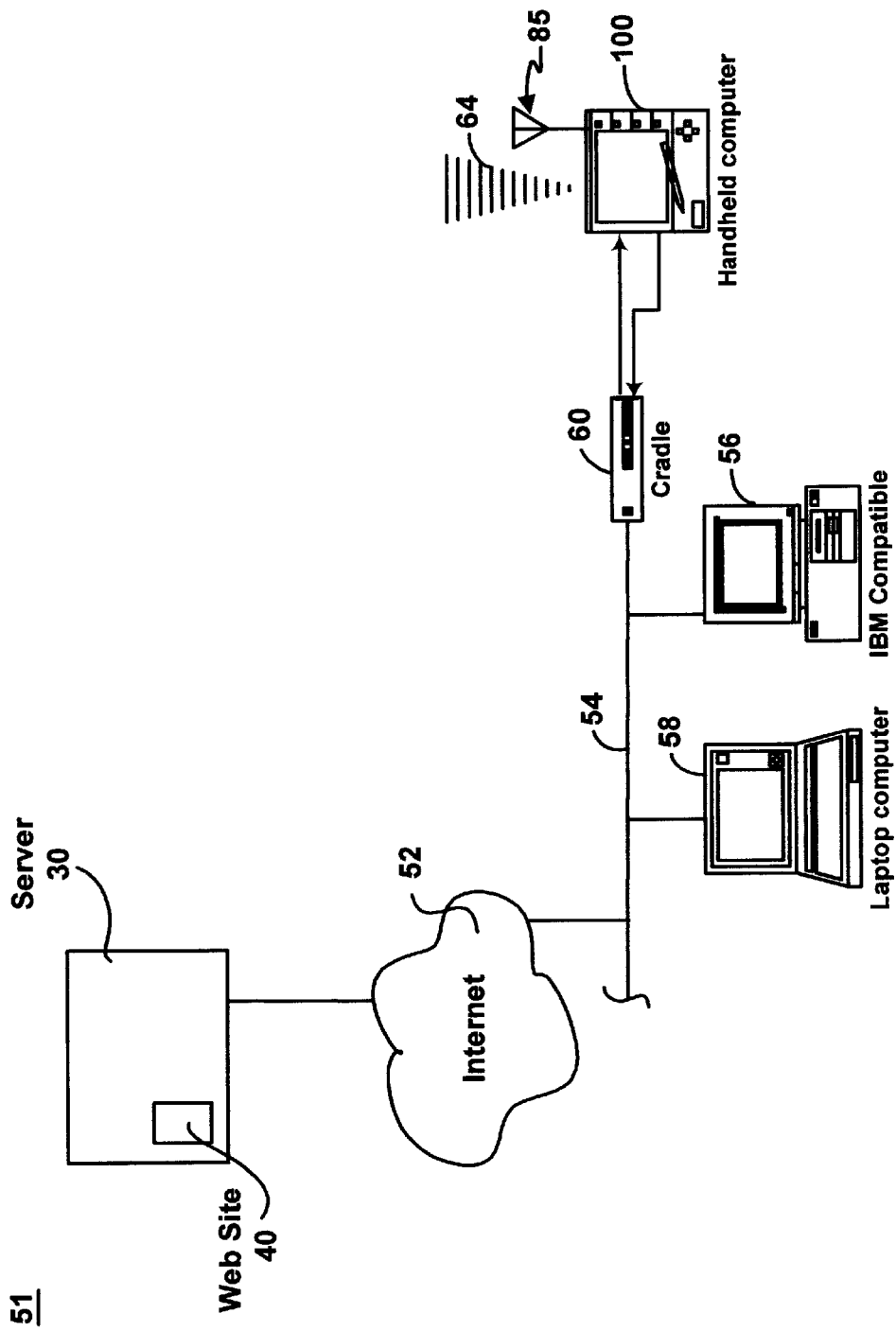
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Bus 54 can provide communication with the Internet 52 using a number of well-known protocols. Coupled with Internet 52 are multiple servers exemplified by server 30. Residing on server 30 is a Web site 40.

In one embodiment, bus 54 is coupled to a cradle 60 for receiving and initiating communication with portable computer system 100 of the present invention. Cradle 60 provides an electrical and mechanical communication interface between bus 54 (and anything coupled to bus 54) and the computer system 100 for two-way communications. Computer system 100 also contains a wireless infrared communication mechanism 64 for sending and receiving information from other devices (e.g., "beaming").

In accordance with the present invention, portable computer system 100 may instead be coupled to host computer systems 56 and 58 via a wireless (radio) connection using antenna 85. In this embodiment, antenna 85 is a lighted antenna that is adapted to visually indicate information about the wireless connection to a user. Additional information is provided in conjunction with FIGS. 10A, 10B, 10C and 11.

Figure 2:
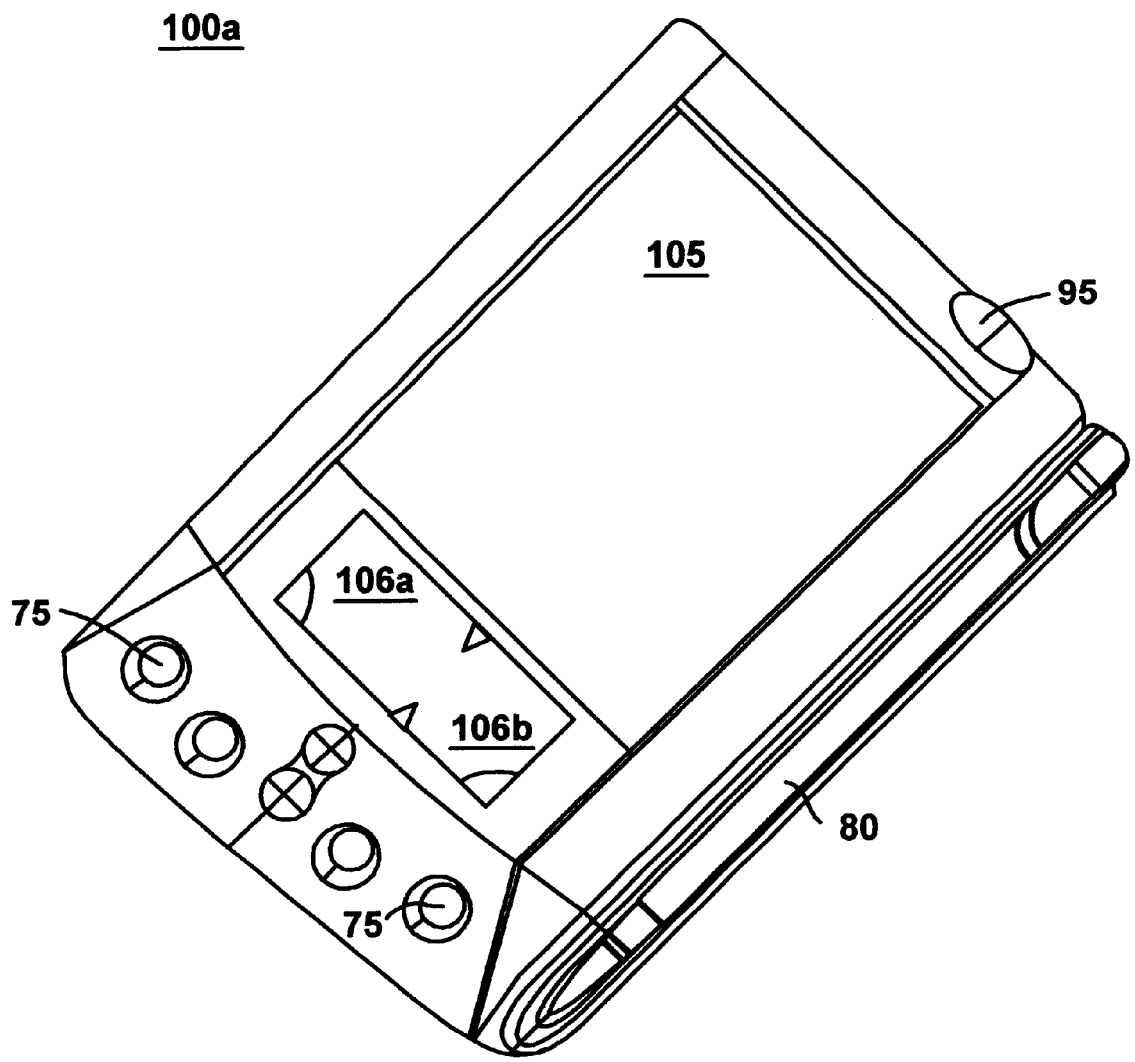
FIG. 2 is a top side perspective view of a portable computer system in accordance with one embodiment of the present invention.

Exemplary Portable Computer System with Wireless Transceiver and Lighted Antenna FIG. 2 is a perspective illustration of the top face 100a of one embodiment of the palmtop computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
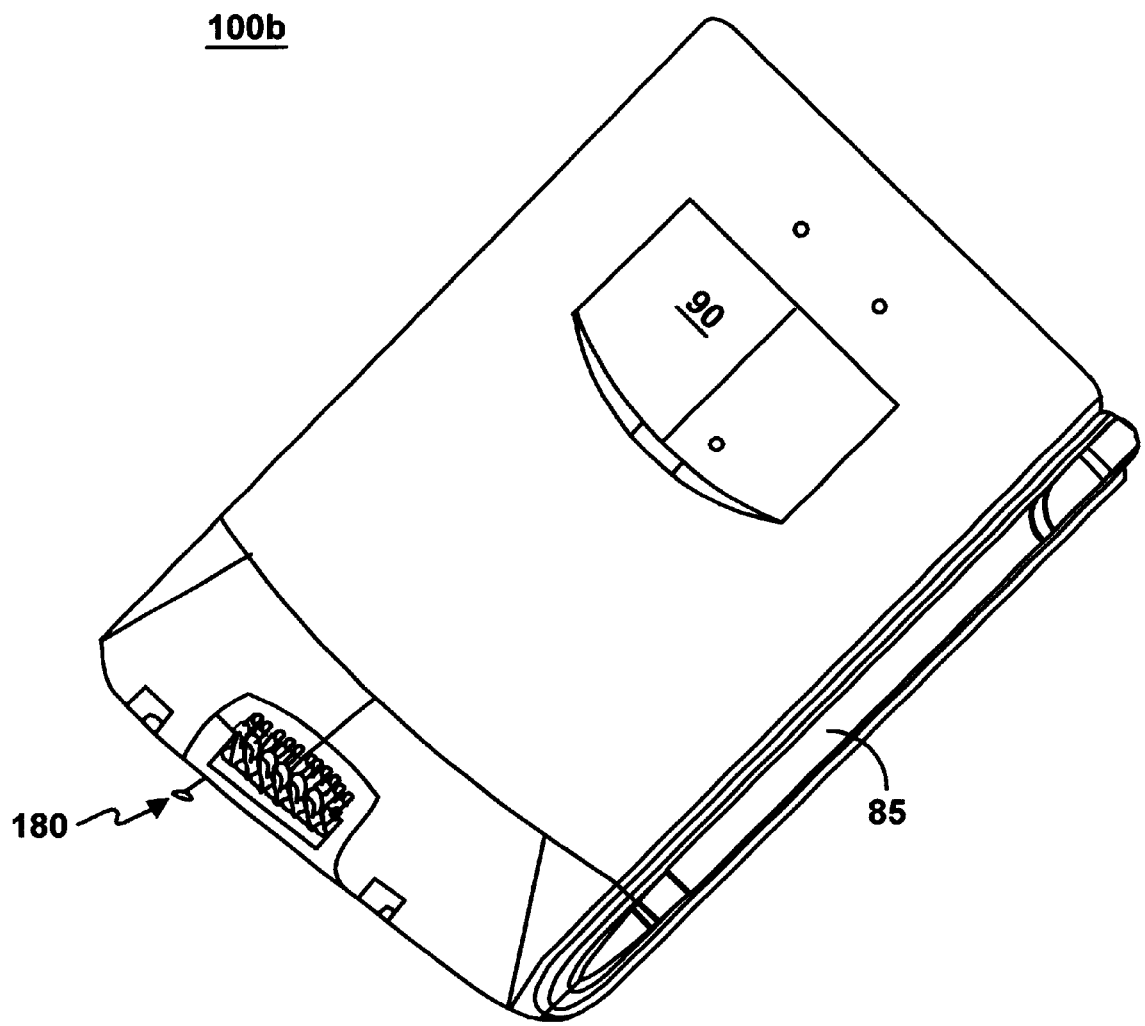
FIG. 3 is a bottom side perspective view of the portable computer system of FIG. 2.

FIG. 3 illustrates the bottom side 100b of one embodiment of the palmtop computer system that can be used in accordance with various embodiments of the present invention. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

An extendible antenna 85 is shown, and also a battery storage compartment door 90 is shown. In accordance with the present invention, antenna 85 is a lighted antenna. Additional information with regard to the lighted antenna is provided in conjunction with FIGS. 10A, 10B, 10C and 11.

Figure 4:
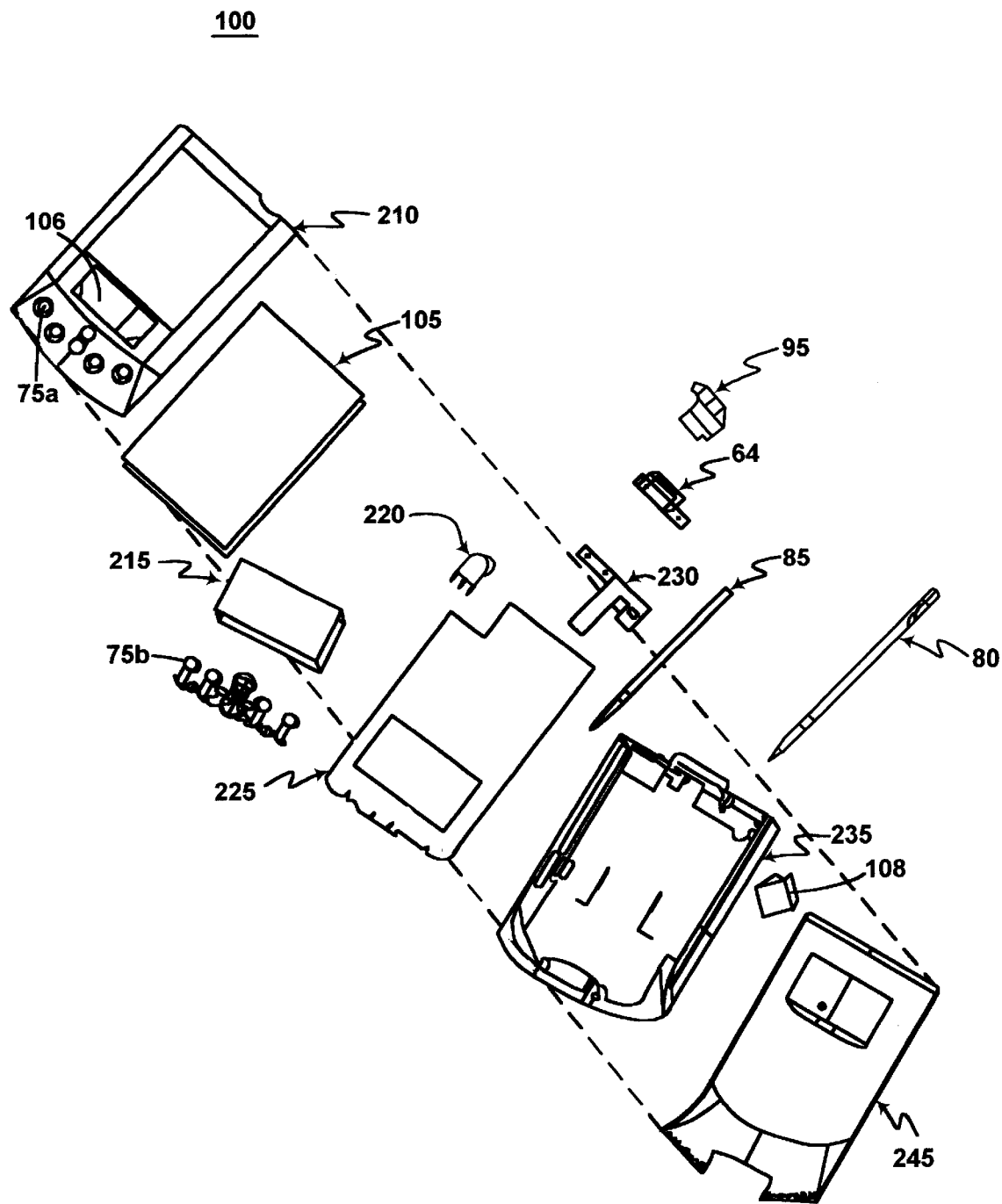
FIG. 4 is an exploded view of the components of the portable computer system of FIG. 2.

FIG. 4 is an exploded view of the palmtop computer system 100 in accordance with one implementation. Computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80.

Position-adjustable antenna 85 is shown. In accordance with the present invention, antenna 85 is a lighted antenna. Additional information is provided in conjunction with FIGS. 10A, 10B, 10C and 11.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
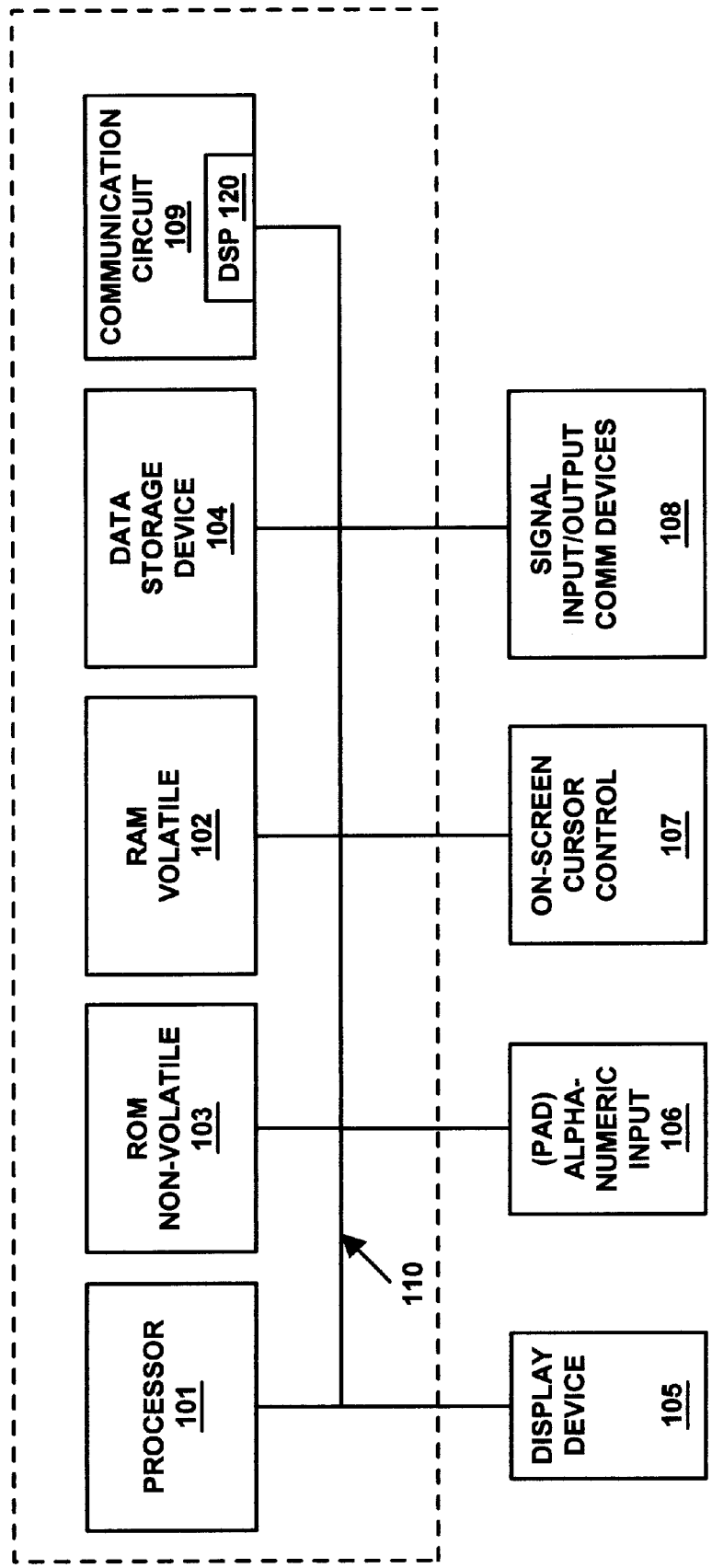
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B). As such, signal transmitter/receiver device 108 enables central processor unit 101 to communicate wirelessly with other electronic systems coupled to the network.

It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Exemplary Wireless Communication System and Device with Lighted Antenna

Figure 6:
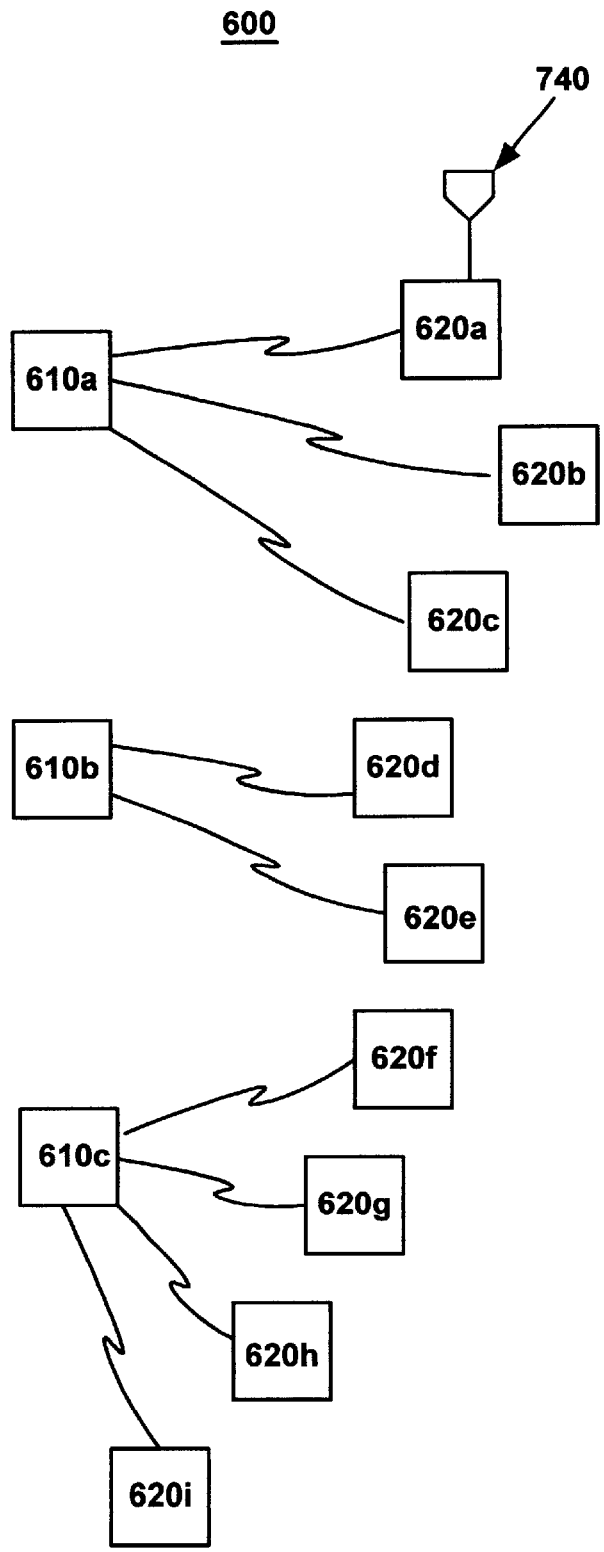
FIG. 6 provides a general overview of a wireless communication system in accordance with one embodiment of the present invention.

FIG. 6 provides a general overview of a wireless communication system 600 in accordance with one embodiment of the present invention. Communication system 600 consists of a family of base stations 610a, 610b and 610c (e.g., cells) that are geographically distributed over the service area. Communication system 600 also includes a plurality of subscriber stations (e.g., transceivers 620a–620i). Communication system can be coupled to a standard telephone wire system (not shown).

Each of transceivers 620a–620i is exemplified as a mobile station such as personal cordless telephone, a pager, or a computer system with a wireless modem; however, a subscriber station may also be in a relatively fixed location, such as a standard computer system with a wireless modem or the like.

Communication is established between a base station (e.g., base station 610a) and a subscriber station (e.g., transceiver 620a) using well-known techniques. Communication can occur using multipath signals from base station 610a to transceiver 620a.

Wireless signals are transmitted and received by transceiver 620a using antenna 740. In accordance with the present invention, antenna 740 is a lighted antenna. As such, antenna 740 can be used to provide a visual indication that conveys information to a user about, for example, the strength of the incoming signals, or whether transceiver 620a is transmitting or receiving. Additional information is provided in conjunction with FIGS. 10A, 10B, 10C and 11.

Figure 7:
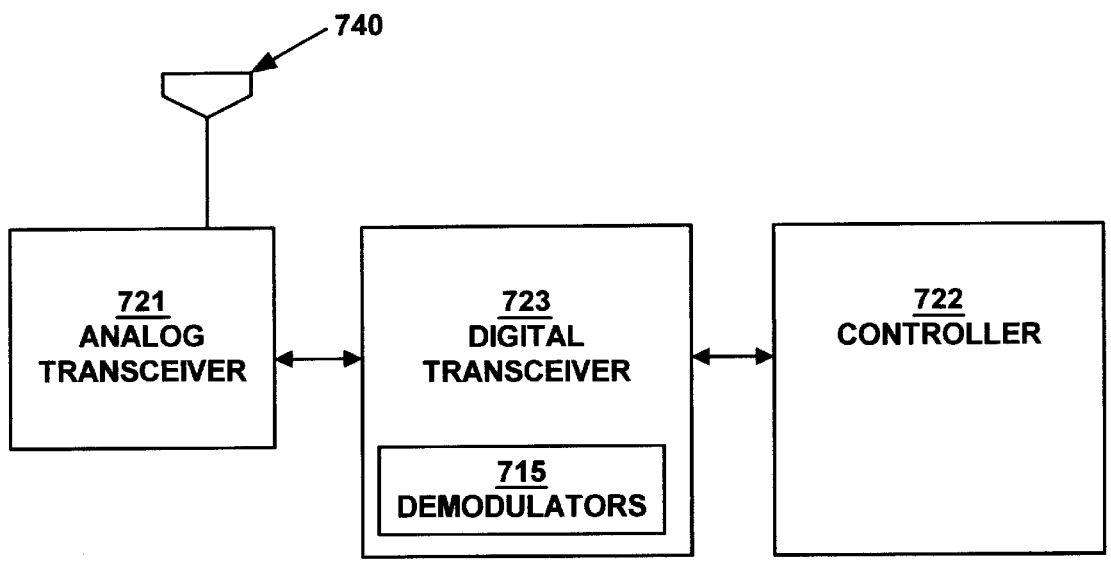
FIG. 7 illustrates the primary functional blocks in an exemplary transceiver in a wireless communication system in accordance with one embodiment of the present invention.

FIG. 7 illustrates the primary functional blocks in a subscriber station exemplified by transceiver 620a in accordance with one embodiment of the present invention. Analog transceiver 721 is used, for example, to receive the communication signal from base station 610a (FIG. 6) and convert it from an analog signal to a digital baseband signal. Controller 722 consists of, for example, the central processing unit, a digital signal processor (if present), hardware control and associated software, and executes the control logic for transceiver 620a. Digital transceiver 723 contains the digital data processing elements such as demodulators 715.

Antenna 740 is shown. In accordance with the present invention, antenna 740 is a lighted antenna. Additional information is provided in conjunction with FIGS. 10A, 10B, 10C and 11.

Figure 8:
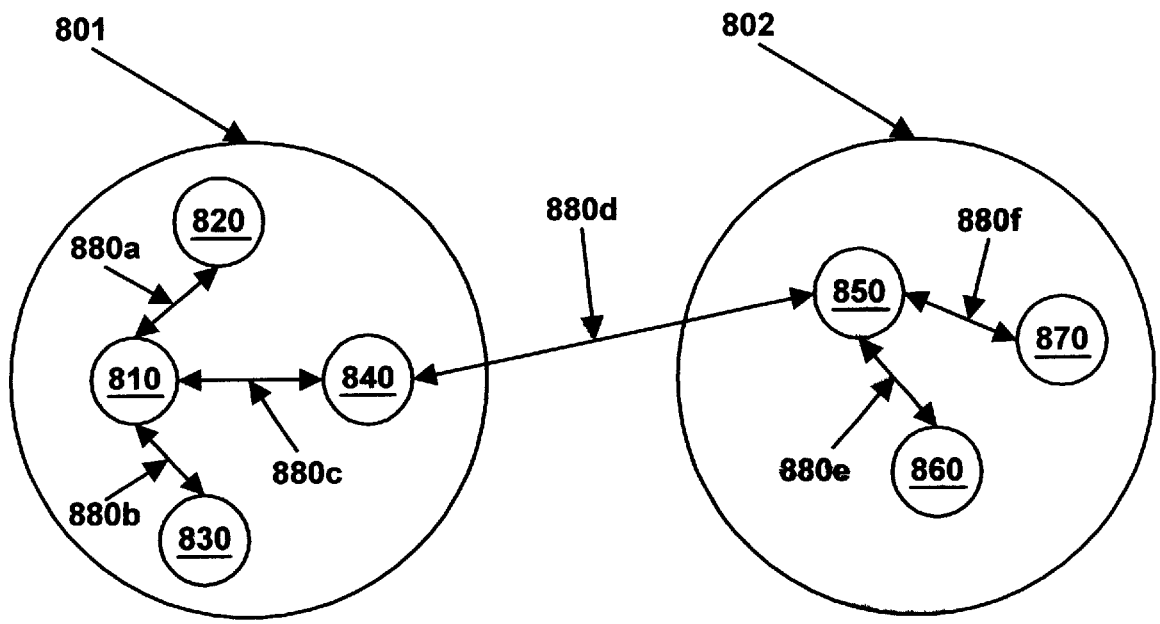
FIG. 8 illustrates one embodiment of a network of devices coupled using wireless connections in accordance with the present invention.

Exemplary Bluetooth System and Wireless Communication Device with Lighted Antenna FIG. 8 illustrates the topology of a network of devices wirelessly connected in a Bluetooth system in accordance with one embodiment of the present invention. Bluetooth is the code name for a technology specification for small form factor, low-cost, short-range radio links between personal computers, mobile phones and other devices. In the parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 810, 820, 830 and 840 are coupled in piconet 801 using wireless connections 880a–c. Similarly, devices 850, 860 and 870 are coupled in piconet 802 using wireless connections 880e–f. Piconet 801 and piconet 802 are coupled using wireless connection 880d. Devices 810–870 can be printers, personal digital assistants (PDAs), desktop computer systems, laptop computer systems, cell phones, fax machines, keyboards, joysticks and virtually any other digital device. In the present embodiment, devices 810–870 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 9:
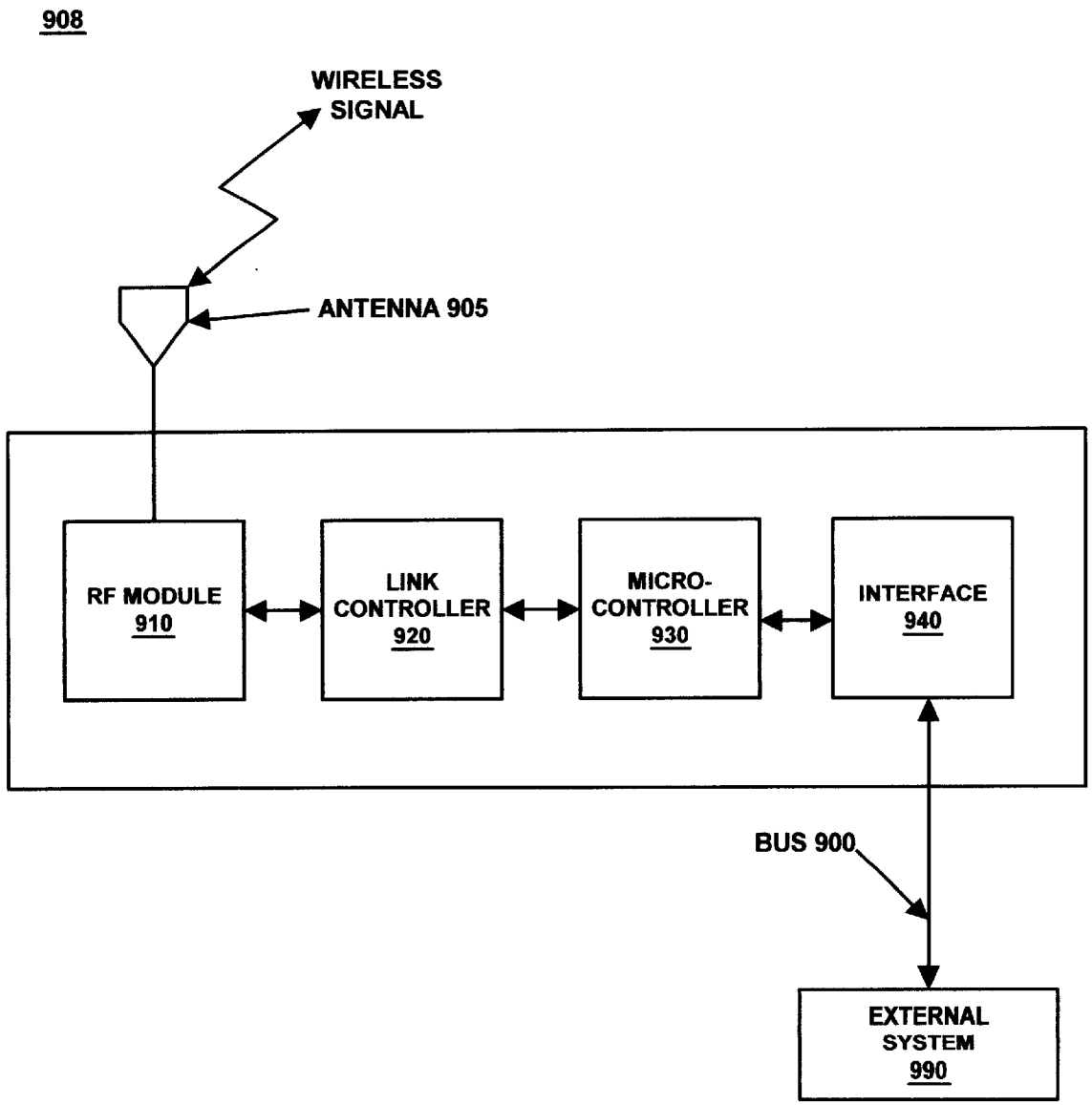
FIG. 9 is a block diagram showing one embodiment of a wireless transceiver in accordance with the present invention.

FIG. 9 is a block diagram of one embodiment of a transceiver 908 in accordance with the present invention. In this embodiment (the "Bluetooth embodiment"), transceiver 908 is a Bluetooth device comprising a digital component (e.g., a Bluetooth controller) and an analog component (e.g., a Bluetooth radio).

In the present embodiment, transceiver 908 comprises an antenna 905 for receiving or transmitting radio signals, a radio frequency (RF) module 910, a link controller 920, a microcontroller (or central processing unit) 930, and an external interface 940. In the present embodiment, transceiver 908 is coupled by a system bus 900 to an external device 990 (e.g., a host device such as a computer system or similar intelligent electronic device, a PDA, a printer, a fax machine, etc.). However, it is appreciated that in another embodiment, transceiver 908 may be integrated into external device 990.

In accordance with the present invention, antenna 905 is a lighted antenna. As such, antenna 905 can be used to provide a visual indication that conveys information to a user about, for example, the strength of the incoming signals, or whether receiver 908 is transmitting or receiving. Additional information is provided in conjunction with FIGS. 10A, 10B, 10C and 11.

In the Bluetooth embodiment, RF module 910 is a Bluetooth radio. In this embodiment, link controller 920 is a hardware digital signal processor for performing baseband processing as well as other functions such as Quality-of- Service, asynchronous transfers, synchronous transfers, audio coding, and encryption.

In one embodiment, microcontroller 930 is an application specific integrated circuit (ASIC). In the Bluetooth embodiment, microcontroller 930 is a separate central processing unit (CPU) core for managing transceiver 908 and for handling some inquiries and requests without having to involve the host device. In the Bluetooth embodiment, microcontroller 930 runs software that discovers and communicates with other Bluetooth devices.

In the present embodiment, before any connections between Bluetooth devices are created, all devices are in a standby mode. In this mode, an unconnected unit "listens" for messages at a regular rate on a set of hop frequencies defined for that unit. In a sniff mode, a Bluetooth device listens to the piconet at a reduced rate (relative to the regular rate). In a park mode, a Bluetooth device is still synchronized to the piconet but does not participate in the traffic.

With reference still to FIG. 9, in the present embodiment, interface 940 is for coupling transceiver 908 to external device 990 in a suitable format, such as but not limited to Universal Serial Bus (USB), Personal Computer Memory Card International Association (PCMCIA), Peripheral Component Interconnect (PCI), CardBus, or Personal Computer (PC) Card. In the present embodiment, interface 940 runs software that allows transceiver 908 to interface with the operating system of external device 990.

Lighted Antenna for a Wireless Transceiver Device

Figure 10A:
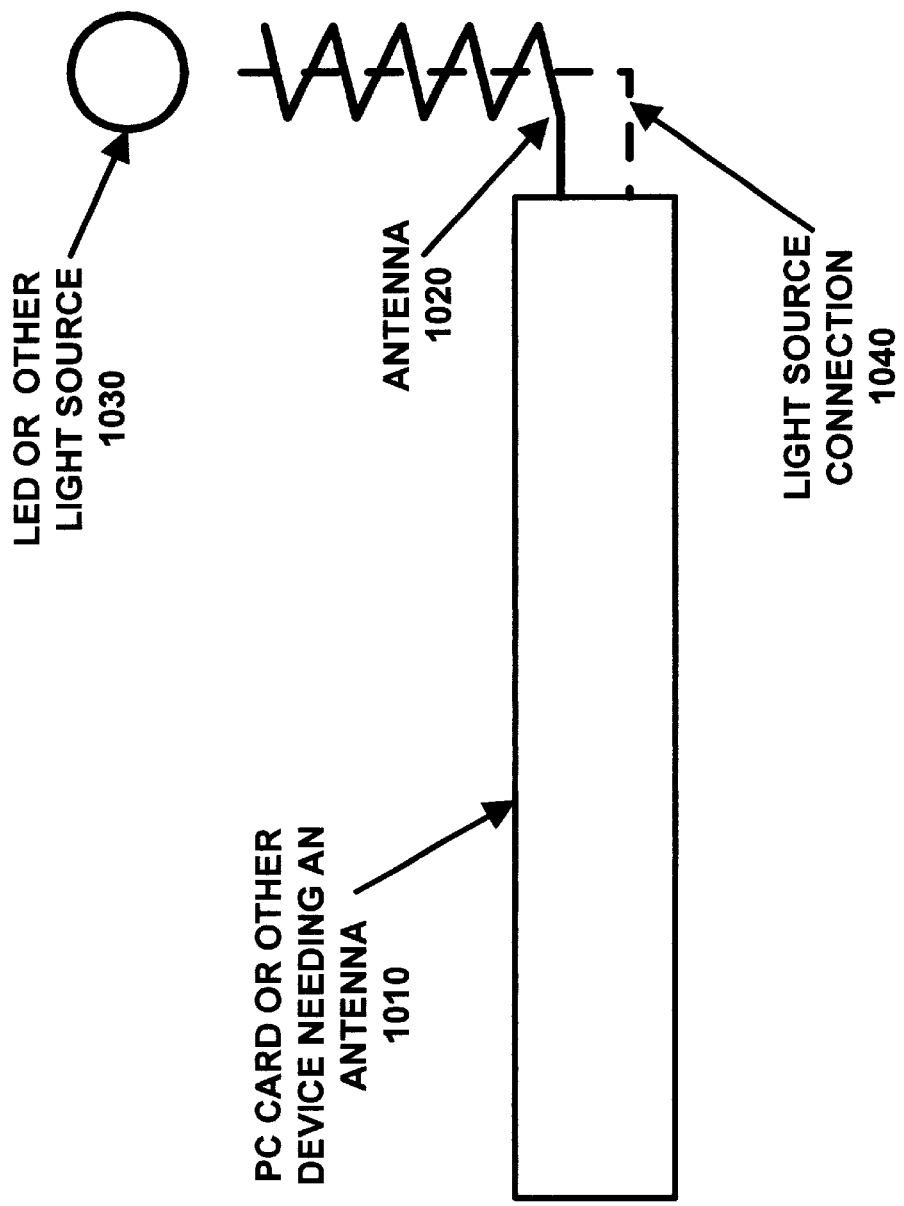
FIGS. 10A, 10B and 10C illustrate embodiments of a lighted antenna for a wireless transceiver in accordance with the present invention.

FIG. 10A is an illustration of one embodiment of a lighted antenna in accordance with the present invention. In the present embodiment, the lighted antenna is comprised of an antenna 1020 for receiving and transmitting wireless signals, and a light-emitting diode (LED) or other light source 1030 coupled via light source connection 1040 to a PC Card 1010 or other device needing an antenna (e.g., a transceiver).

In this embodiment, the light source 1030 is located at the tip of antenna 1020. That is, light source 1030 is located at the distal end of antenna 1020 (relative to the base end of antenna 1020 that is coupled to the PC Card, transceiver, etc.). All or part of the antenna 1020 is externally located (e.g., outside of a housing) and thus light source 1030 is visible to a user.

In the present embodiment, the lighted antenna is shown coupled to a PC Card; however, it is appreciated that the lighted antenna can also be used in applications not using a PC Card. Additionally, the lighted antenna of the present invention can be implemented in various types of devices, including but not limited to a portable computer system 100 (FIG. 1A through FIG. 5), transceiver 620a (FIGS. 6 and 7), and Bluetooth transceiver 908 (FIG. 9).

With reference still to FIG. 10A, in the present embodiment, antenna 1020 is wound around light source connection 1040, and thus interference with the reception and transmission of wireless signals is not significant. In one embodiment, the lighted antenna is capacitively coupled with the PC Card 1010 or other device needing an antenna, in order to protect the PC Card or device from current that could flow back from light source connection 1040.

In the present embodiment, the lighted antenna (specifically, light source 1030) can be used to provide a visual indication that conveys information to a user about, for example, the strength of the incoming signals, whether the transceiver is transmitting or receiving, whether a data connection has been made, or whether a Bluetooth piconet has been detected. For example, light source 1030 can be on or off to indicate whether or not a signal is being received or transmitted. Also, the intensity of light source 1030 can be varied to indicate the strength of a signal being received.

In other embodiments, light source 1030 can include more than one light source or LED. In addition, each light source or LED can be a different color. Accordingly, one light source or LED could be used to indicate that PC Card 1010 (or other device needing an antenna, e.g., a transceiver) is transmitting, and another light source or LED could be used to indicate that the transceiver or PC Card 1010 is receiving. Similarly, the number of light sources or LEDs that are illuminated could be used to indicate signal strength.

In one embodiment, a processor, application-specific integrated circuit (ASIC), or the like (e.g., processor 101 of FIG. 5, controller 722 of FIG. 7, or microcontroller 930 of FIG. 9) is coupled to PC Card 1010 (or other device needing an antenna, e.g., a transceiver) and/or the antenna 1020. The processor, ASIC or the like can execute instructions in hardware, firmware or software for controlling light source 1030. For example, a processor can be used to determine if the transceiver or PC Card 1010 is transmitting or receiving, and can illuminate one LED or another depending on which is the case. The processor can thus be used to intelligently select and illuminate one or more LEDs, or a particular pattern or combination of LEDs, depending on the type of information to be conveyed to the user.

Figure 10B:
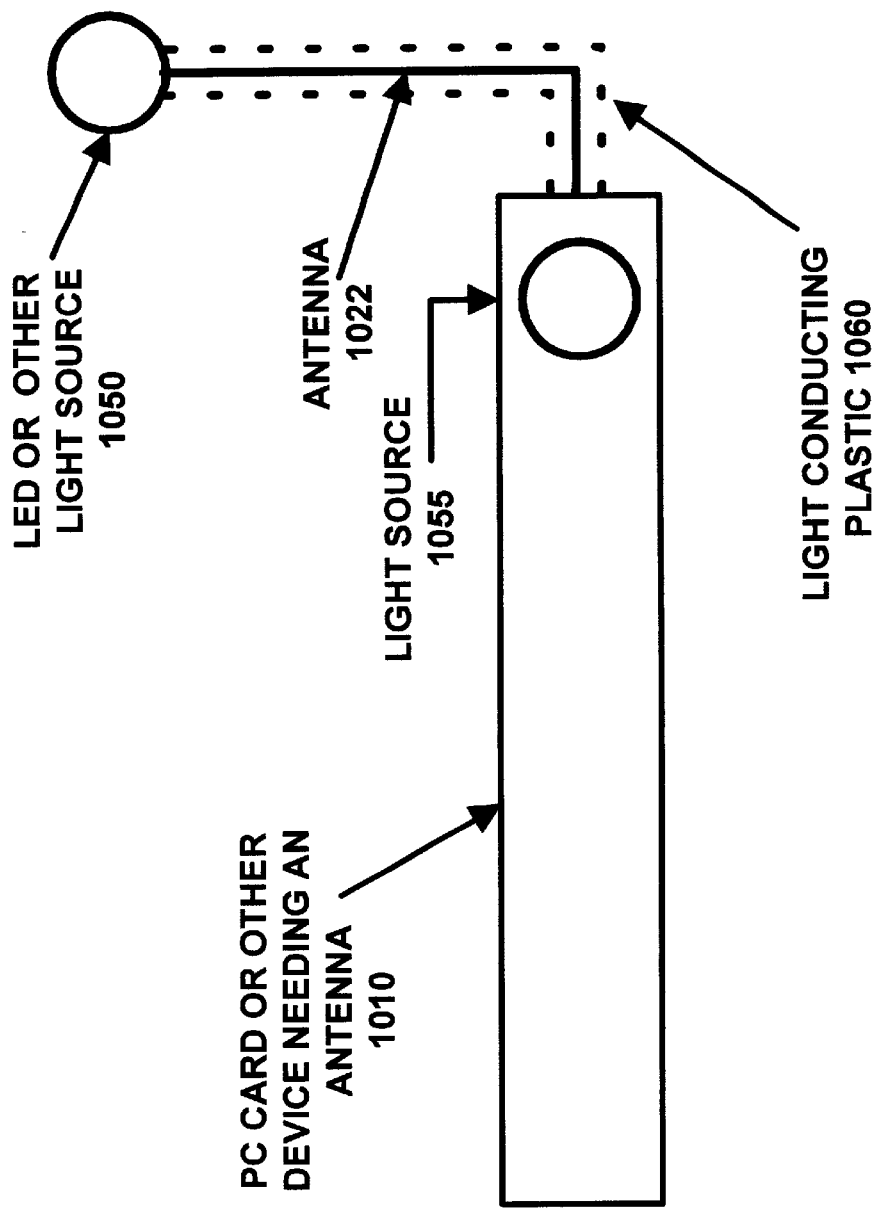

FIG. 10B is an illustration of another embodiment of a lighted antenna in accordance with the present invention. In this embodiment, the light source 1055 (e.g., an LED) is located at the base of antenna 1022.

In one embodiment, antenna 1022 is encased in light-conducting plastic 1060 or other material capable of conducting light from light source 1055 to the tip of the lighted antenna. In this embodiment, the tip of the lighted antenna is comprised of light-transmitting plastic 1050 or other material capable of transmitting light. Light from light source 1055 is conducted along the length of antenna 1022 and made visible to a user at the tip (distal end) of the lighted antenna. Thus, light source 1055 can be used to provide a visual indication conveying information to a user about, for example, the strength of the incoming signals, whether the transceiver is transmitting or receiving, or whether a data connection has been made.

In another embodiment, antenna 1022 can be encased in multiple, separate conduits of light-conducting plastic, each conduit coupled to a separate light source at the base of the antenna. In this manner, light source 1055 can include multiple lights or LEDs, including different color lights or LEDs. The light from each LED can be separately conducted via a conduit to the tip of antenna 1022. Thus, the visual indication can be made up of different patterns or combinations depending on the type of information to be conveyed to the user, as explained above in conjunction with FIG. 10A.

Figure 10C:
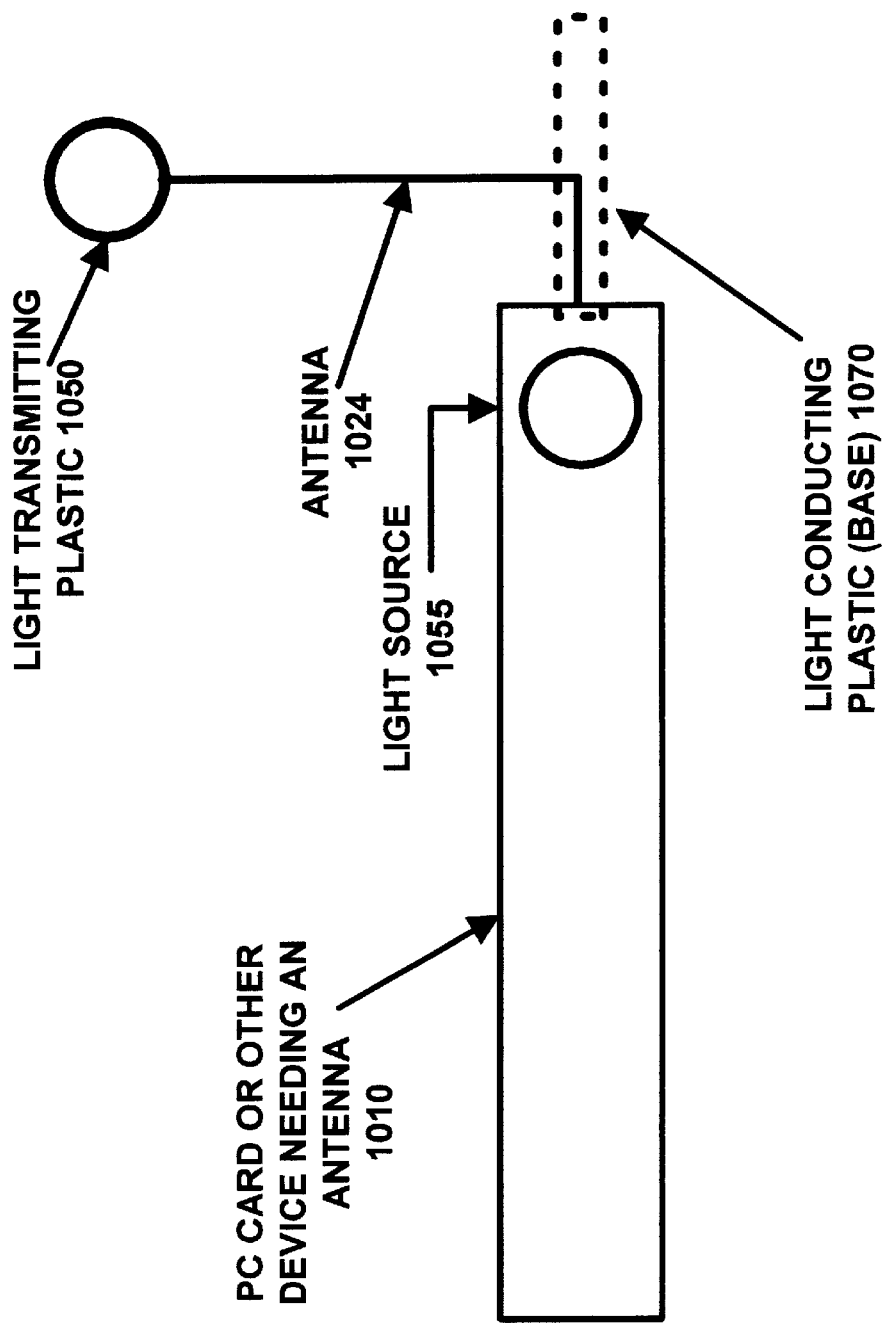

FIG. 10C is an illustration of another embodiment of a lighted antenna in accordance with the present invention. In this embodiment, the light source 1055 is located at the base of antenna 1024. Here, light-conducting plastic or other material capable of conducting light encases the base portion (1070) of the antenna 1024, and the remaining portion of the antenna is encased in light-transmitting plastic 1050 or other material capable of transmitting light. It is appreciated that the base 1070 can be fixed or movable.

In the present embodiment, light from light source 1055 is conducted through light-conducting plastic base 1070 and made visible to a user along the portion of the lighted antenna that is encased in light-transmitting plastic 1050. Thus, light source 1055 can be used to provide a visual indication conveying information to a user about, for example, the strength of the incoming signals, whether the transceiver is transmitting or receiving, or whether a data connection has been made.

In another embodiment, antenna 1024 can be encased in multiple, separate conduits of light-transmitting plastic, each conduit coupled to a separate light source at the base of the antenna. In this way, light source 1055 can include multiple lights and/or different color lights, combinations of which can be used to provide a visual indication to the user as explained above in conjunction with FIGS. 10A and 10B.

Figure 11:
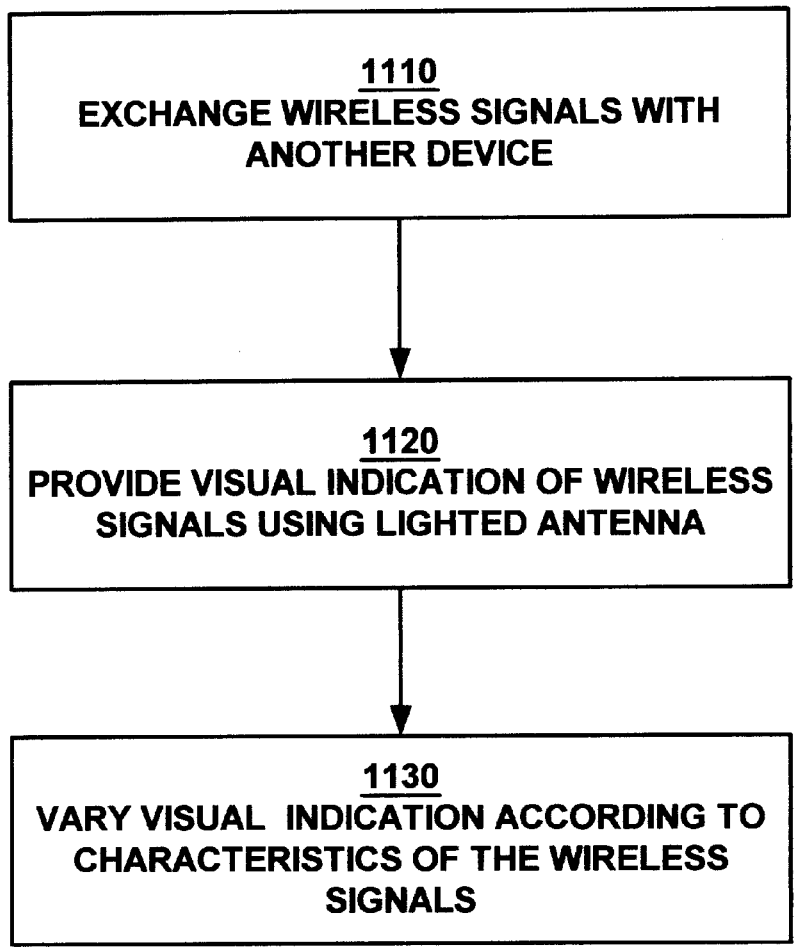
FIG. 11 is a flowchart of the steps in a process for providing information about a wireless connection using a lighted antenna in accordance with one embodiment of the present invention.

FIG. 11 is a flowchart of the steps in a process 1100 for providing information about a wireless connection using a lighted antenna in accordance with one embodiment of the present invention. Process 1100 is implemented using the embodiments of a lighted antenna described above in conjunction with FIGS. 10A, 10B and 10C.

In step 1110 of FIG. 11, wireless signals are sent to and/or received from another device. The sending and receiving devices can be any of the various types of devices having a transceiver, including but not limited to a portable computer system 100 (FIG. 1A through FIG. 5), transceiver 620a (FIGS. 6 and 7), and Bluetooth transceiver 908 (FIG. 9).

In step 1120 of FIG. 11, in accordance with the present invention, a lighted antenna is used to provide a visual indication to a user. The visual indication provides information regarding the wireless connection, such as the strength of the incoming signals, whether the transceiver is transmitting or receiving, whether a data connection has been made, or whether a Bluetooth device or piconet has been detected. For example, the lighted antenna can be illuminated or not to indicate whether or not the transmitter is sending or receiving.

In step 1130, the visual indication can be varied according to the characteristics of the wireless signals or according to the type of information that is to be conveyed to the user. In one embodiment in which multiple light sources are used, different numbers or combinations of lights (e.g., LEDs) can be used, for example, to distinguish between whether the transceiver is sending or receiving. Similarly, the number of lights that are illuminated can be varied according to the strength of the incoming signals. In accordance with one embodiment of the present invention, the number, pattern or combination of lights can be intelligently selected and illuminated, depending on the type of information to be conveyed to the user.

Thus, the present invention provides a device and method that can be used to more effectively utilize the space available on a portable device, without reducing the functionality currently provided by such devices. In particular, the present invention provides a device and method that can be used in a portable wireless communication device, such as a cell phone, a portable computer system (e.g., personal digital assistant), a Bluetooth device, and the like. The multi-functionality of a lighted antenna is particularly suited for smaller devices where space is at a premium. With a lighted antenna, additional features and functionality can be incorporated into a transceiver device while maintaining the form factor of existing designs.

The preferred embodiment of the present invention, a lighted antenna for a transceiver device, is thus described. While the present invention has been described in particular embodiments, it should be appreciated that the present invention should not be construed as limited by such embodiments, but rather construed according to the below claims.

What is claimed is:

1. A device for sending and receiving signals to and from another device via a wireless connection and for providing information about said wireless connection to a user, said device comprising:

a housing;

a transceiver disposed within said housing, said transceiver adapted to send and receive wireless signals;

an antenna having a base end and a distal end, said antenna coupled to said transceiver at said base end and extending from said housing, wherein at least a portion of said antenna is encased in light-transmitting material visible externally of said device; and a light source coupled to said light-transmitting material by a light-conducting material, wherein light from said light source is conducted to said light-transmitting material and made externally visible along said portion of said antenna encased in said light-transmitting material, wherein said light from said light source provides a visual indication of a wireless signal and wherein said visual indication is varied according to a characteristic of said wireless signal.

2. The device of claim 1 wherein said visual indication is varied according to wireless signal strength.

3. The device of claim 1 wherein said visual indication is varied according to a type of wireless signal.

4. The device of claim 3 comprising:

a processor coupled to said transceiver, said processor adapted to vary said visual indication.

5. The device of claim 4 comprising:

a memory unit coupled to said processor, said memory unit for storing instructions executed by said processor for varying said visual indication.

6. The device of claim 1 wherein said visual indication is varied in color.

7. The device of claim 1 wherein said visual indication is varied in intensity.

8. The device of claim 1 wherein said transceiver is a Bluetooth-enabled device.

9. In a device comprising a transceiver and an antenna, a method for providing information about a wireless connection to a user, said method comprising the steps of:

a) sending and receiving signals to and from another device via said wireless connection;

b) providing a visual indication of a wireless signal, wherein said visual indication is displayed using said antenna, said antenna coupled to said transceiver and extending from said device, wherein at least a portion of said antenna is encased in light-transmitting material visible externally of said device, said light-transmitting material coupled to a light source by a light-conducting material, wherein light from said light source is conducted to said light-transmitting material, wherein light from said light source is made externally visible along said portion of said antenna encased in said light-transmitting material, wherein said light from said light source provides a visual indication of a wireless signal and wherein said visual indication is varied according to a characteristic of said wireless signal; and c) varying said visual indication according to a characteristic of said wireless signal.

10. The method as recited in claim 9 wherein said step c) comprises the step of:

varying said visual indication according to wireless signal strength.

11. The method as recited in claim 9 wherein said step c) comprises the step of:
   varying said visual indication according to a type of wireless signal.

12. The method as recited in claim 9 wherein said step c) comprises the step of:
   varying said visual indication in color.

13. The method as recited in claim 9 wherein said step c) comprises the step of:
   varying said visual indication in intensity.

14. The method as recited in claim 9 wherein said transceiver is a Bluetooth-enabled device.

15. A portable computer system comprising:
   a housing;
   a transceiver disposed within said housing, said transceiver adapted to send and receive wireless signals;
   an antenna having a base end and a distal end, said antenna coupled to said transceiver at said base end and extending from said housing, wherein at least a portion of said antenna is encased in light-transmitting material visible externally of said device;
   a light source coupled to said light-transmitting material by a light-conducting material, wherein light from said light source is conducted to said light-transmitting material and made externally visible along said portion of said antenna encased in said light-transmitting material, wherein said light from said light source provides a visual indication of a wireless signal and wherein said visual indication is varied according to a characteristic of said wireless signal; and
   a processor coupled to said transceiver, said processor adapted to vary said visual indication.

16. The portable computer system of claim 15 wherein said visual indication is varied according to wireless signal strength.

17. The portable computer system of claim 15 comprising:
   a memory unit coupled to said processor, said memory unit for storing instructions executed by said processor for varying said visual indication.

18. The portable computer system of claim 15 wherein said visual indication is varied according to a type of wireless signal.

19. The portable computer system of claim 15 wherein said visual indication is varied in color.

20. The portable computer system of claim 15 wherein said visual indication is varied in intensity.

* * * * *